(12) United States Patent
Huotari et al.

(10) Patent No.: US 8,255,556 B2
(45) Date of Patent: Aug. 28, 2012

(54) MULTICAST AND SYNCHRONIZATION EMULATION FOR CONTENT TRANSFORMED STREAMS

(75) Inventors: Allen J. Huotari, Garden Grove, CA (US); Kendra Harrington, Irvine, CA (US); Siddhartha Dattagupta, Irvine, CA (US); Thomas Cowling, Des Moines, WA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 12/817,630

(22) Filed: Jun. 17, 2010

(65) Prior Publication Data

US 2011/0314083 A1    Dec. 22, 2011

(51) Int. Cl.
*G06F 15/16* (2006.01)
(52) U.S. Cl. ....................................... 709/231
(58) Field of Classification Search .................... 709/231
See application file for complete search history.

(56) References Cited

U.S. PATENT DOCUMENTS

| | | | |
|---|---|---|---|
| 6,154,771 A * | 11/2000 | Rangan et al. | 709/217 |
| 7,007,295 B1 * | 2/2006 | Rose et al. | 725/86 |
| 7,082,142 B1 * | 7/2006 | Begeja | 370/507 |
| 7,657,644 B1 * | 2/2010 | Zheng | 709/231 |
| 7,788,393 B2 * | 8/2010 | Pickens et al. | 709/231 |
| 2002/0065928 A1 * | 5/2002 | Senga et al. | 709/231 |
| 2006/0085553 A1 * | 4/2006 | Rachwalski et al. | 709/233 |
| 2006/0200575 A1 * | 9/2006 | Sherer et al. | 709/231 |
| 2007/0033286 A1 * | 2/2007 | Min | 709/228 |
| 2007/0101012 A1 * | 5/2007 | Li et al. | 709/231 |
| 2008/0040500 A1 * | 2/2008 | Cohen | 709/231 |
| 2009/0055540 A1 * | 2/2009 | Foti et al. | 709/228 |
| 2010/0106851 A1 * | 4/2010 | Aoki et al. | 709/231 |

* cited by examiner

*Primary Examiner* — Brian P Whipple
(74) *Attorney, Agent, or Firm* — Haynes and Boone, LLP

(57) ABSTRACT

Embodiments of the present disclosure emulate multicast by generating and synchronizing multiple unicasts of a single content in different encoding formats to multiple devices on a shared network. In one embodiment, a method for multicast emulation includes receiving a request to join an active stream containing a media content. The method also includes identifying a position of the active stream from which to start a new unicast stream of the same media content. The method further includes providing the new unicast stream starting from the identified position, where the new unicast stream is in a format independent from the format of the active stream and the new unicast stream is synchronized to the active stream.

20 Claims, 4 Drawing Sheets

Stream Discovery Pull

Stream Discovery Push

MULTICAST AND SYNCHRONIZATION EMULATION FOR CONTENT TRANSFORMED STREAMS

TECHNICAL FIELD

The present disclosure relates generally to data transmission in a shared network. In particular, the present disclosure relates to multicast emulation and synchronization of data streams to multiple devices in a shared network.

BACKGROUND

A shared network provides universal access to content for devices in homes and offices. A shared network may be a logically shared network or a physically shared network. An example of an architecture for a logically shared network is the UPnP (Universal Plug and Play) architecture that supports plug-and-play functionality, zero-configuration networking, and automatic discovery of services. A device in a shared network can dynamically join the shared network, obtain an Internet Protocol (IP) address, learn about the presence and capabilities of other devices, and obtain media content from other devices. For example, a video playback device may browse and render video files stored and streamed from a source device over the network. A physically shared network encompasses devices that share physical media such as wireless channels, coaxial cables, or power lines. Often, it is desirable for multiple devices to render the same content across the shared network.

However, there are two inherent challenges to streaming a single content to multiple devices on a shared network. First, using a native multicast in a shared network is often not possible because the shared network may have devices with heterogeneous PHY/MAC (Physical/Media Access Controller) layers. And even if the network has devices with a homogeneous PHY/MAC layer, the PHY layer itself may be shared and there may be unique node-to-node channel characteristics that would prevent the use of native multicast. The second challenge is that the rendering devices on the network may have different rendering capabilities that require data to be provided in different encoding format even when streamed as a single content. Existing solutions to the PHY/MAC challenge include generating multiple streams using an IP multicast over L2 (layer 2) unicast encapsulation. However, these solutions do not address how to stream a single content to devices with different decoding capabilities.

Therefore, there is a need to be able to stream a single content to multiple devices on a network having heterogeneous PHY/MAC layers or channel characteristics, and/or to devices with different rendering capabilities.

BRIEF DESCRIPTION OF THE DRAWINGS

These figures are provided to assist in describing embodiments of the disclosure, and are not intended to be exclusive or limiting. In the figures, like reference numerals designate like elements.

DESCRIPTION

Overview

In one embodiment, a method for multicast emulation includes receiving a request to join an active stream containing a media content. The method also includes identifying a position of the active stream from which to start a new unicast stream of the same media content. The method further includes providing the new unicast stream starting from the identified position, where the new unicast stream is in a format independent from the format of the active stream and the new unicast stream is synchronized to the active stream.

In one embodiment, an apparatus includes a media source configured to provide a media content. The apparatus also includes a stream generator configured to provide an active stream of the media content in a first format. The apparatus further includes an interface unit configured to receive a request to join the active stream. Upon the interface unit receiving the request, the stream generator is further configured to generate a new unicast stream of the same media content in a second format. The new unicast stream is generated starting from an identified position of the active stream. The new unicast stream is also synchronized with the active stream and the first format and the second format are independent.

In one embodiment, an apparatus includes a client interface unit configured to discover an active client and an additional client on a shared network. The apparatus further includes a server interface unit configured to receive an active stream of a media content for the active client and to request a new unicast connection to receive a new unicast stream of the same media content for the additional client.

Description of Example Embodiments

A shared network architecture is a distributed, open networking architecture where rendering devices access media content such as audio/video/picture/data files hosted on source devices. Embodiments of the present disclosure emulate multicast by generating and synchronizing multiple unicasts of a single content in different encoding formats or in the same encoding format to multiple devices. Synchronization between the multiple unicasts may be coarse such that multiple devices render the single content at approximately the same time. Thus, two or more rendering devices with heterogeneous PHY/MAC layers, different channel characteristics, or different rendering capabilities may receive a single content across the shared network.

Figure 1:
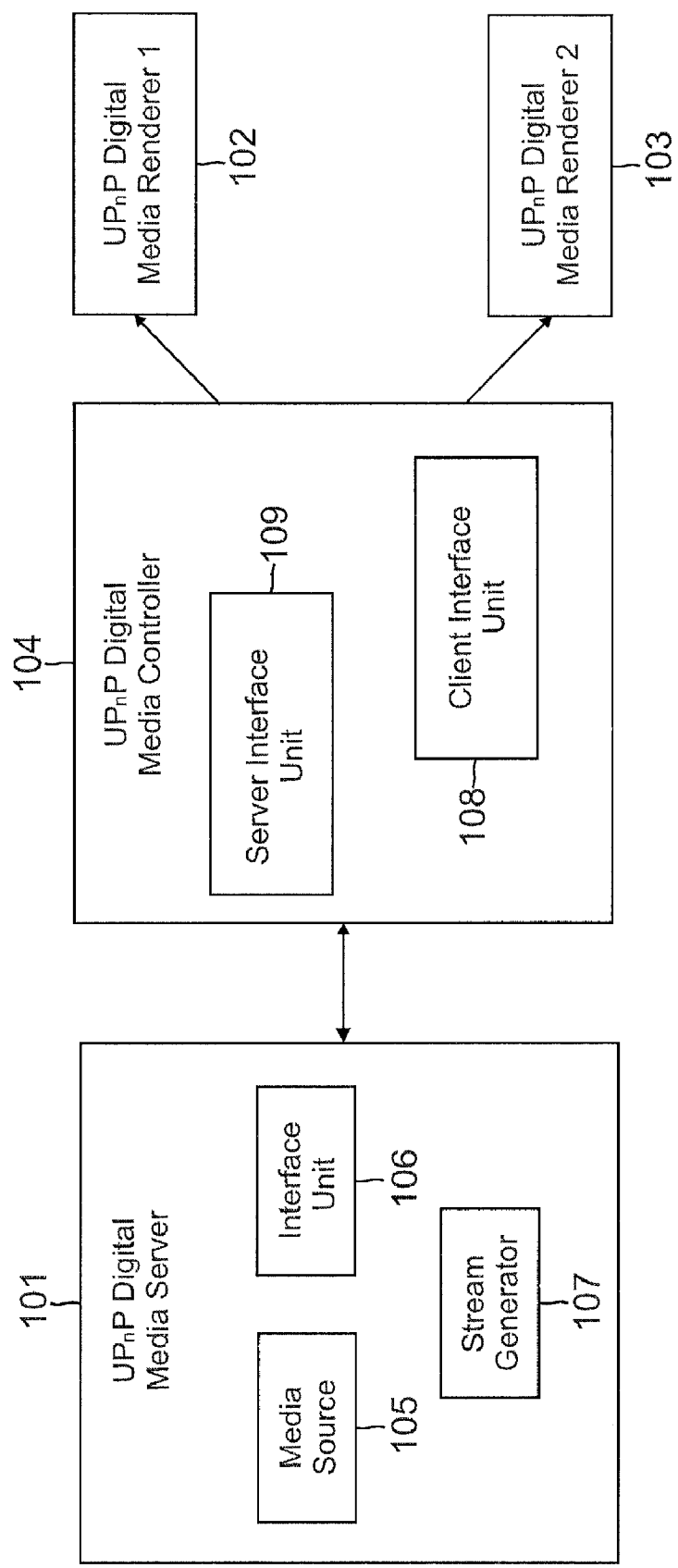
FIG. 1 illustrates an UPnP network showing two rendering devices rendering the same content streamed from a server on a shared network according to one or more embodiments of the present disclosure.

FIG. 1 illustrates an UPnP network showing two rendering devices rendering the same content streamed from a server on a shared network according to one or more embodiments of the present disclosure. The UPnP network may include an UPnP digital media server (DMS) 101, a first UPnP digital media renderer (DMR1) 102, a second UPnP digital media renderer (DMR2) 103, and an UPnP digital media controller (DMC) 104. It is appreciated that even though FIG. 1 partitions the UPnP network into the logical units as represented by DMS 101, DMR1 102, DMR2 103, and DMC 104, the physical partitioning of the UPnP network may be different. For example, one or more of the logical units may be collocated in the same physical unit.

DMS 101 acts as a source device to share or stream media content to client devices on the network. For example, DMS 101 may be a content server that stores and streams video/audio content over the network to client devices DMR1 102 and DMR2 103. DMS 101 includes a media source 105 to provide the media content, an interface unit 106 to interface with client devices, and a stream generator 107 to stream the media content to the client devices.

DMR1 102 and DMR2 103 render media content received from DMS 101 for display or playback. DMR1 102 and DMR2 103 may have different rendering capabilities and require data in different encoding format or they may render data in the same encoding format. For example, DMR1 102 may be a video device that playbacks video in a high-definition (HD) video format, and DMR2 103 may be a video device that plays video in a standard-definition (SD) video format.

DMR1 102 and DMR2 103 interface with DMS 101 through DMC 104. DMC 104 is a device that can auto-detect media servers on the network to set up connections between DMS 101 and client devices. For example, DMC 104 may be an intelligent remote control that has the capability to find content on DMS 101 and to match the content to the rendering capabilities of DMR1 102 and DMR2 103. In the example of DMR1 102 with the HD video playback capability and DMR2 103 with the SD video playback capability, DMC 104 sets up a HD video stream from DMS 101 to DMR1 102 and a SD video stream of the same content from DMS 101 to DMR2 103. DMC 104 includes a client interface unit 108 to discover and interface with client devices, and a server interface unit 109 to interface with media servers.

The two video streams to DMR1 102 and DMR2 103 are synchronized and represent two unicast streams of a single content in different encoding formats. Synchronization may be in the form of a coarse synchronization due to the difficulty of obtaining a fine synchronization of content streams to devices with different PHY/MAC layers, different channel characteristics, or different decoding latencies. Coarse synchronization may be performed at DMS 101 by a time alignment of the two unicast streams without compensating for any difference in path delays of the two streams due to the different transit paths, PHY/MAC layers, channel characteristics, or decoding latencies. Alternatively, if the difference in path delays to DMR1 102 and DMR2 103 is coarsely known, DMS 101 may improve coarse synchronization between the two unicast video streams. For example, DMS 101 may calculate and introduce an offset between the two unicast streams at the source to compensate for the difference in path delays to achieve better synchronized rendering at the devices.

Even though the two unicast streams in different encoding formats represent videos of a single content, the two unicast video streams may come from multiple ones of DMS 101. In addition, when there are multiple ones of DMS 101, the multiple ones of DMS 101 need not be geographically collocated. For example, the HD video stream may come from a source outside the home, such as a HD broadcast source. On the other hand, the SD video stream may come from a transcoding device such as a DMS in the home. The transcoding device receives and transcodes the HD video stream into the SD video stream required by DMR2 103. Alternatively, the two unicast video streams may be generated from two or more media files on a single DMS 101.

Figure 2:
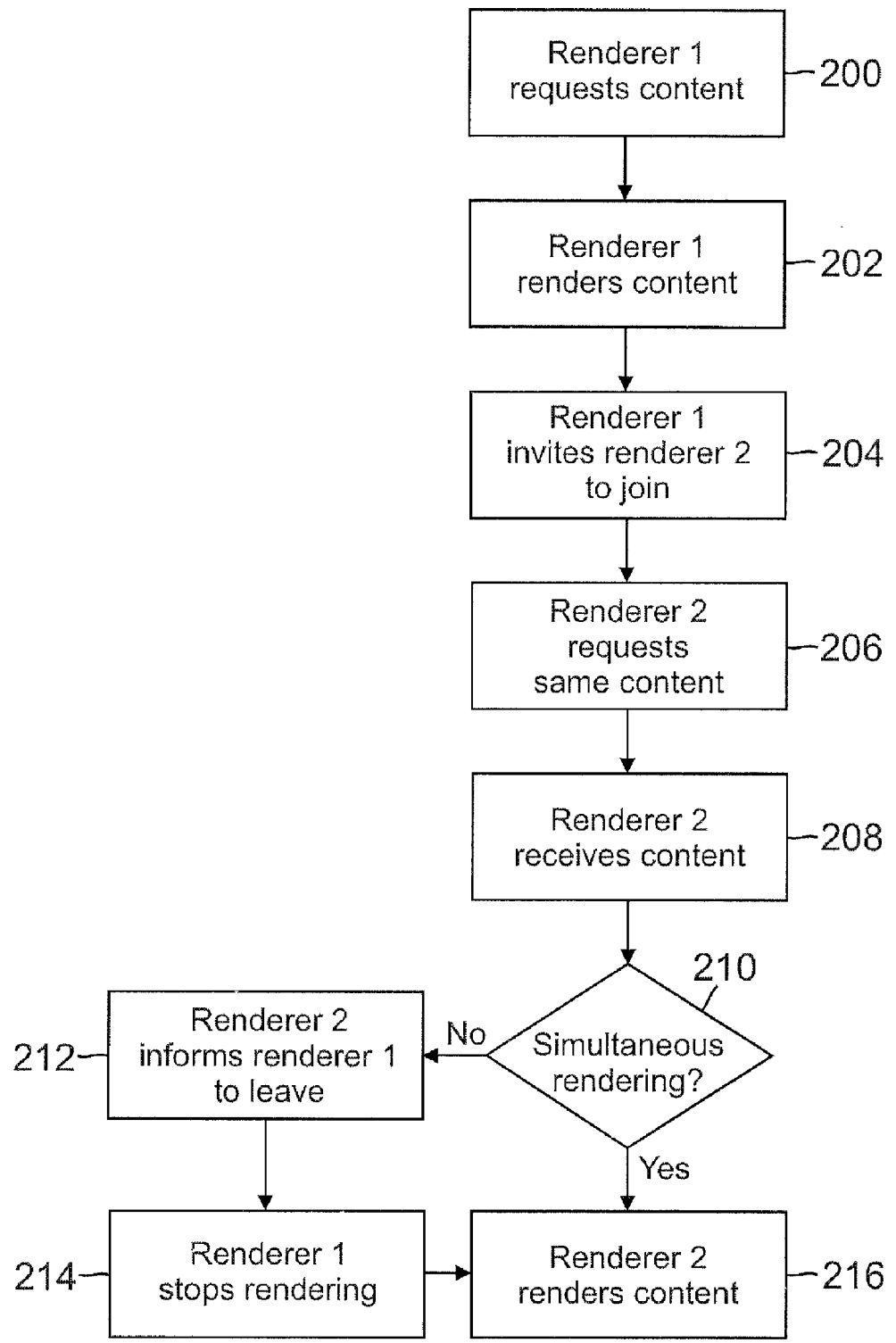
FIG. 2 illustrates a method for a second rendering device on a shared network to request the same content that is streamed to a first rendering device in a "come with me" scenario or in a "multi-room content stream" scenario according to one or more embodiments of the present disclosure.

FIG. 2 illustrates a method for a second rendering device on a shared network to request the same content that is streamed to a first rendering device in a "come with me" scenario or in a "multi-room content stream" scenario according to one or more embodiments of the present disclosure. The second rendering device emulates joining a multicast group and is provided the content via a new unicast stream. This method may be used in the "come with me" scenario where after the unicast stream to the second rendering device is established, the first rendering device leaves the multicast group and the stream to the first rendering device is terminated. This scenario enables session mobility for a user who desires to move the content to a new rendering device. Alternatively, the method may be used in the "multi-room content stream" scenario where the first rendering device stays in the multicast group after the unicast stream to the second rendering device is established. In such a scenario, there would be simultaneous rendering of the same content on multiple rendering devices.

In step 200, a first rendering device requests content from a media server and emulates joining a multicast group. Using FIG. 1 as an example, this may be accomplished when DMC 104 detects the presence of DMR1 102 and directs DMR1 102 to request a unicast stream of the desired content from DMS 101. In step 202, a unicast stream of the requested content in a format supported by the first rendering device is provided to the first rendering device. For example, DMS 101 may provide a unicast HD video stream to DMR1 102.

In step 204, the presence of a second rendering device is detected and the second rendering device is invited to join the multicast group. For example, when DMC 104 detects the presence of DMR2 103 on the shared network, DMR1 102 or DMC 104 may invite DMR2 103 to join DMR1 102. In step 206, the second rendering device requests for the same content that is provided to the first rendering device and emulates joining the multicast group. For example, DMR2 103 may request a new unicast stream of the video provided to DMR1 102.

The second rendering device may request to join the multicast group in a number of scenarios. In one scenario, the second rendering device may be joining a paused stream, such as when the first rendering device has paused its unicast stream in anticipation of the second rendering device joining the multicast group. After the second rendering device joins the multicast group, the new unicast stream may resume in the same encoding format or in a different format as the first unicast stream. Alternatively, the second rendering device may be joining a moving stream of a stored or recorded content that has not been interrupted. Similar to joining the paused stream, when joining the moving stream the new unicast stream may be provided in the same encoding format or in a different format as the first unicast stream. In another scenario, the second rendering device may be joining a moving stream of live content, such as TV broadcast. However, the new unicast stream may be provided by a transcoding device that transcodes the live TV broadcast to a different format from that of the first unicast stream.

The point of the active stream at which the second rendering device may join the multicast group also presents several possibilities. For example, when joining a paused stream of stored or recorded content, the media server or the second rendering device may select a scene as cataloged in a scene index. The media server may fast forward or reverse to the selected scene to start the new unicast stream when it resumes. Similarly, when joining a moving stream of stored or recorded content, the media server or the second rendering device may select the nearest scene to join. The media server may again fast forward or reverse to the selected scene to start the duplicate unicast stream.

The identification of a position for the new unicast stream to start may also be done for either byte based or time based seeking. Byte based seeking may be based on frame numbers. For example, if the stored or recorded content is marked by frame numbers, the media server may start the new unicast stream at the current frame number of the content when the second rendering device requests to join. Alternatively, the new unicast stream may start at a next frame number or an upcoming frame number selected by the media server or the second rendering device.

If the stored or recorded content is marked by time, the second rendering device or the media server may request to join at a selected future time. Alternatively, if the first unicast stream is paused, the second rendering device or the media server may request to join at a selected past time. In this case, the second unicast stream will start from the selected past time. When the time of the second unicast stream matches the time at which the first unicast stream is paused, the first unicast stream is resumed so that the two unicast streams are synchronized thereafter. Note that whether the new unicast stream joins the active stream on a scene, or on a byte based or time based seeking, additional offsets may be introduced between the two streams to compensate for the difference in path delays to achieve better rendering synchronization at the rendering devices.

In step 208, a second unicast stream of the desired content in the format supported by the second rendering device is provided to the second rendering device starting from the identified position of the active stream. For example, DMS 101 may provide a unicast SD video stream to DMR2 103 when DMR2 103 joins the multicast group.

In step 210, after the second rendering device joins the multicast group, a decision is made on whether the first rendering device should stay in the multicast group for simultaneous rendering of the same content. If there is no simultaneous rendering of the same content on multiple rendering devices, as in the come-with-me scenario, the second rendering device informs the first rendering device to leave the multicast group along with the conditions under which it should leave in step 212. For example, DMR2 103 may inform DMR1 102 through DMC 104 when to leave the multicast group. In step 214, the first rendering device emulates leaving the multicast group and the unicast stream to the first rendering device is terminated. Finally, in step 216, the second rendering device renders the content provided through its unicast stream.

Alternatively, if there is simultaneous rendering of the same content on multiple rendering devices, as in the "multi-room content stream" scenario, the first rendering device stays in the multicast group after the second rendering device joins the multicast group. In step 216, both the first and the second rendering devices render the content provided through their respective unicast streams.

Figure 3:
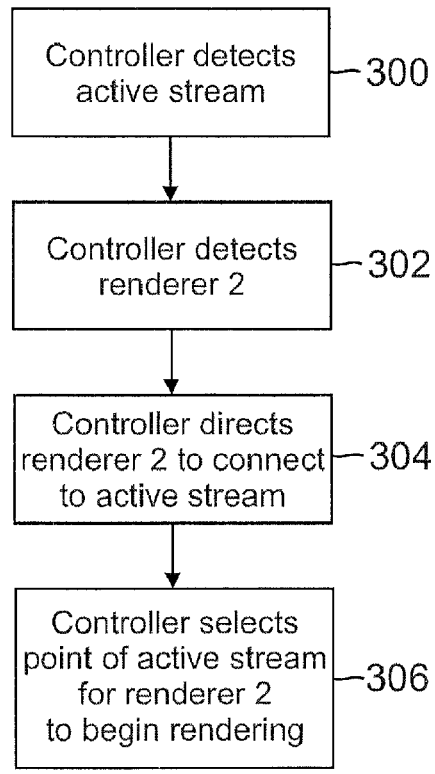
FIG. 3 shows a method for initiating the stream of same content to a second rendering device on a shared network using a stream discovery pull according to one or more embodiments of the present disclosure.

There are also multiple implementation methods for a rendering device to request a new unicast stream when joining a multicast group. FIG. 3 shows a method for initiating a new unicast stream to a second rendering device using a stream discovery pull method according to one or more embodiments of the present disclosure.

In the stream discovery pull method, a control point discovers the existence of an active stream in step 300. For example, DMC 104 may discover the unicast stream to DMR1 102. The active stream may be advertised as a live content such as a broadcast content, or as a channel content such as a recorded content. As pointed to earlier when discussing step 204 of FIG. 2, the active stream may be paused or may be a moving stream.

In step 302, the control point detects the existence of the renderers other than the one rendering the active stream and then selects a renderer to join the multicast. For example, DMC 104 may detect the presence of DMR2 103 on the shared network and may select DRM2 103 to join DMR1 102. In step 304, the control point directs the selected renderer to establish a new unicast connection to the server providing the stream. For example, DMC 104 may direct DMR2 103 to request a new unicast stream of the active stream to DMR1 102 from DMS 101.

In step 306, the control point identifies the point of the active stream for the new unicast stream to start. The server provides the new unicast stream starting at the identified position and the selected renderer begins rendering the new unicast stream. The active stream may be accessed to start the new unicast stream at an anticipated "live position," which is the current temporal position of the stream that is in progress, or the active stream may be accessed randomly. As pointed to earlier when discussing step 204 of FIG. 2, the identification of a position for the new unicast stream to start may present several possibilities, such as one based on a scene, on a byte, or on a time. The new unicast stream is coarse synchronized with the active stream. Also, the new unicast stream may be provided in a different encoding format from the active stream to support the different capabilities of the rendering devices. Note that in the stream discovery pull method, the control point directs the selected renderer to establish a new unicast connection to "pull" the active stream from some position of the active stream.

Figure 4:
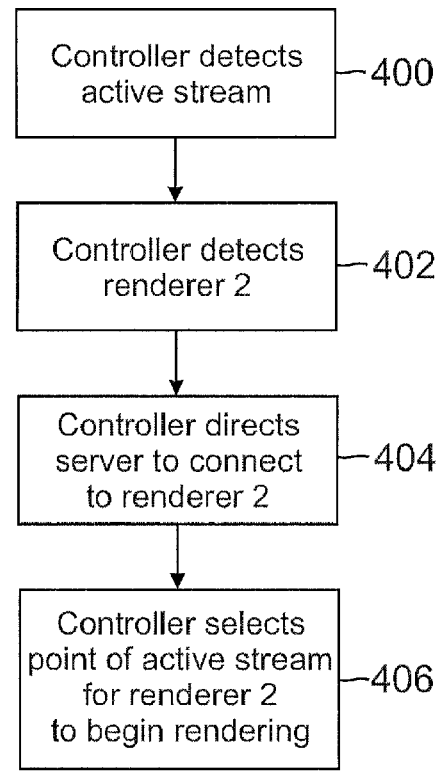
FIG. 4 shows a method for initiating the stream of same content to a second rendering device on a shared network using a stream discovery push according to one or more embodiments of the present disclosure.

FIG. 4 shows a method for initiating a new unicast stream to a second rendering device using a stream discovery push method according to one or more embodiments of the present disclosure. As in the stream discovery pull method of FIG. 3, a control point discovers the existence of an active stream in step 400. Also as in the stream discovery pull method, the control point detects the existence of the renderers and then selects a renderer to join the multicast in step 402.

However, contrary to the stream discovery pull method, the control point in the stream discovery push method directs the server providing the active stream to establish a new unicast connection to the selected renderer in step 404. For example, DMC 104 may direct DMS 101 to establish a new unicast stream of the active stream to DMR2 103. In step 406, the control point directs the server to start the new unicast stream at a position selected by the control point. For example, DMC 104 may direct DMS 101 to start the new unicast stream at an anticipated live position, or at some random location of the active stream.

Note that in the stream discovery push method, the control point directs the server to establish a new unicast connection to "push" the active stream from some position of the active stream. In contrast, in the stream discovery pull method of FIG. 3, the control point directs the selected renderer to establish a new unicast connection to "pull" the active stream from some position of the active stream. Also, there may be implementation advantages in the stream discovery push method over the stream discovery pull method since the server is inherently aware of the live position of the active stream. This may make it easier for the server when it establishes the new unicast stream in the stream discovery push method.

Figures 5, 6:
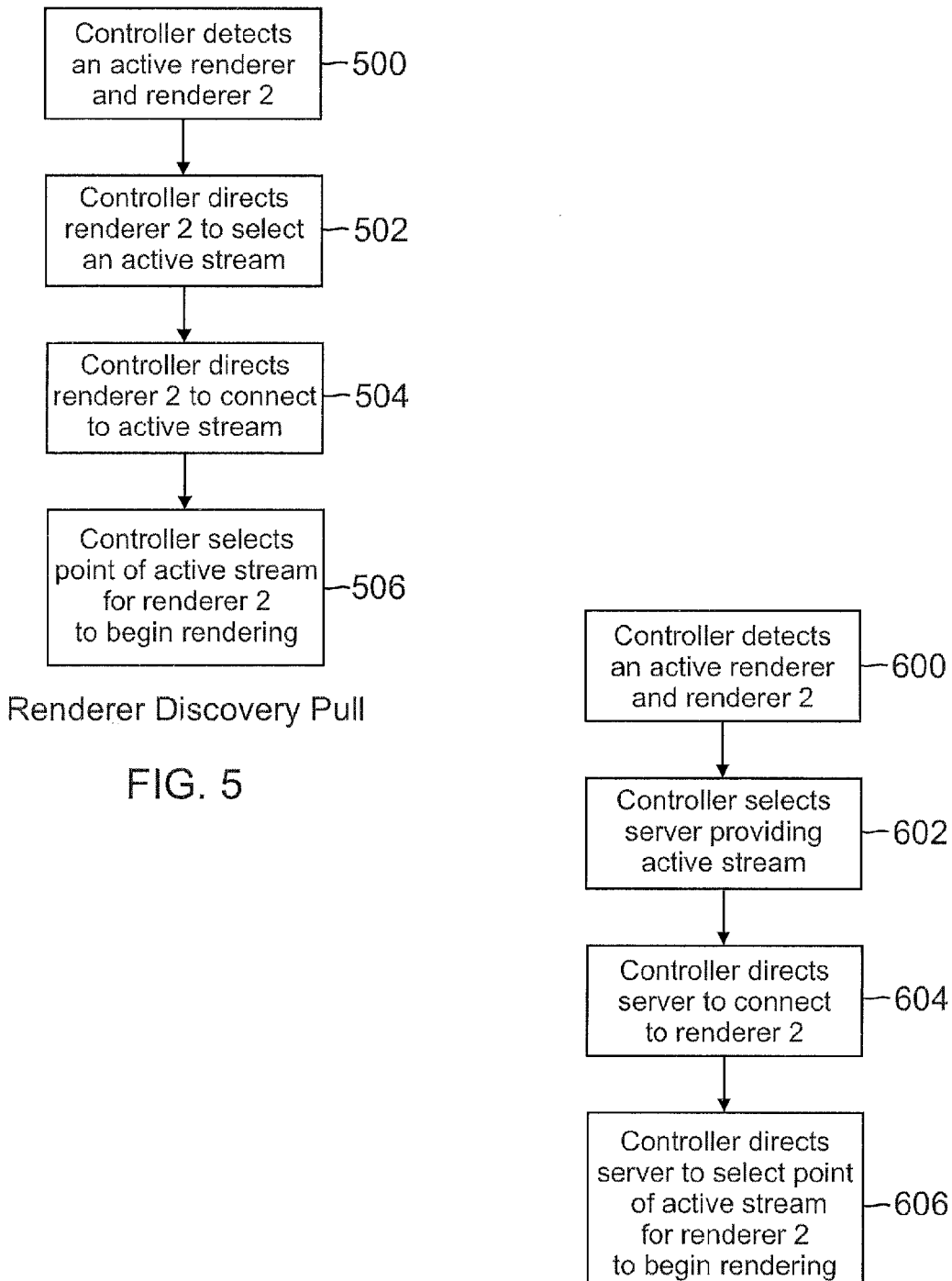
FIG. 5 shows a method for initiating the stream of same content to a second rendering device on a shared network using a renderer discovery pull according to one or more embodiments of the present disclosure.
FIG. 6 shows a method for initiating the stream of same content to a second rendering device on a shared network using a renderer discovery push according to one or more embodiments of the present disclosure.

FIG. 5 shows a method for initiating a new unicast to a second rendering device using a renderer discovery pull method according to one or more embodiments of the present disclosure. In the renderer discovery method, the control point first discovers the existence of the renderers and then selects a renderer to join the active stream or streams in step 500. This is in contrast to the stream discovery methods of FIGS. 3 and 4 where the control point first discovers the existence of the active stream. One of the renderers discovered from step 500 is the currently active renderer rendering the active stream to be shared. In addition, the control point discovers other renderers and selects a renderer to join the active stream or streams. For example, DMC 104 may discover the presence of DMR1 102 rendering the active stream, and may also discover and select DMR2 103 to join DMR1 102.

In step 502, the control point directs the selected renderer to choose the active stream currently being rendered. In step 504, the control point directs the selected renderer to establish a new unicast connection to the server providing the stream. In step 506, the control point identifies the point of the active stream for the new unicast stream to start. The server then provides the new unicast stream starting at the identified position and the selected renderer begins rendering the new unicast stream. Steps 504 and 506 are similar to steps 304 and 306 of the stream discovery pull method of FIG. 3.

FIG. 6 shows a method for initiating a new unicast to a second rendering device using a renderer discovery push method according to one or more embodiments of the present disclosure. As in the renderer discovery pull method of FIG. 5, a control point discovers the existence of the active renderer rendering the active stream or streams to be shared and also discovers the existence of other renderers in step 600. The control point then selects a renderer to join the stream or streams. In step 602, the control point selects the server providing the active stream or streams to be shared.

However, in contrast to the renderer discovery pull method, the control point in the renderer discovery push method directs the server providing the active stream to establish a new unicast connection to the selected renderer in step 604. For example, after DMC 104 discovers DMR1 102 with its active stream and DMR2 103, DMC 104 may direct the DMS 101 to establish a new unicast stream of the active stream to DMR2 103. In step 606, the control point identifies the point of the active stream for the new unicast stream to start. The server provides the new unicast stream starting at the identified position and the selected renderer begins rendering the new unicast stream.

Note that in the renderer discovery push method, the control point directs the server to establish a new unicast connection to "push" the active stream from some position of the active stream. In contrast, in the renderer discovery pull method of FIG. 5, the control point directs the selected renderer to establish a new unicast connection to "pull" the active stream from some position of the active stream. Also, there may be implementation advantages in the renderer discovery push method over the renderer discovery pull method since the server is inherently aware of the live position of the active stream. This may make it easier for the server when it establishes the new unicast stream in the renderer discovery push method.

It should be understood that modifications and alterations may be made to the embodiments of the disclosure presently described without departing from the spirit and scope of the appended claims. The description given is not intended to be exhaustive or to limit the embodiments of the disclosure to the precise embodiments disclosed. For example, even though embodiments of the disclosure are described as UPnP networks, the disclosure may encompass other types of shared networks. It should be further understood that the disclosure is limited only by the claims and the equivalents thereof.

What is claimed is:

1. A method for multicast emulation, comprising:
  receiving a request to join an active unicast stream of a content delivered to a first device;
  identifying a position of the active unicast stream to start a new unicast stream of the content to a second device; and
  providing the new unicast stream starting from the position, wherein the new unicast stream is synchronized to the active unicast stream to deliver the content simultaneously to the first device and the second device.

2. The method of claim 1, further comprising terminating the active unicast stream after the new unicast stream is provided.

3. The method of claim 1, wherein the new unicast stream is synchronized to the active unicast stream with an offset to compensate for a difference in path delays of the active unicast stream and the new unicast stream.

4. The method of claim 1, wherein a format of the new unicast stream is different from a format of the active unicast stream.

5. The method of claim 1, wherein the new unicast stream is joining the active unicast stream that has been paused and the active unicast stream is resumed when the new unicast stream is provided.

6. The method of claim 1, wherein the new unicast stream is joining the active unicast stream with no interruption to the active unicast stream.

7. The method of claim 1, wherein said identifying a position comprises identifying a scene from an index of scenes of the active unicast stream.

8. The method of claim 1, wherein said identifying a position comprises identifying a frame number of the active unicast stream.

9. The method of claim 1, wherein said identifying a position comprises identifying a time corresponding to the position of the active unicast stream.

10. The method of claim 9, wherein the active unicast stream has been paused and a time to start the new unicast stream corresponds to a time before the time at which the active unicast stream was paused, and wherein the active unicast stream is resumed when a running time of the new unicast stream matches the time at which the active unicast stream was paused.

11. A non-transitory machine readable medium adapted to store a plurality of machine readable instructions which when executed by one or more processors of a server are adapted to cause the server to perform a method comprising:
  receiving a media content from a media source,
  providing an active unicast stream of the media content in a first format delivered to a first device, and
  receiving a request to join the active unicast stream from a second device, wherein upon receiving the request, the method further comprises generating a new unicast stream of the media content in a second format starting from an identified position of the active unicast stream, wherein the new unicast stream is synchronized with the active unicast stream to deliver the content simultaneously to the first device and the second device.

12. The non-transitory machine readable medium of claim 11, wherein the method further comprises terminating the active unicast stream after the new unicast stream is generated.

13. The non-transitory machine readable medium of claim 11, wherein the method further comprises receiving a request to establish a new unicast connection and establishing the new unicast connection for the new unicast stream.

14. The non-transitory machine readable medium of claim 11, wherein the active unicast stream and the new unicast stream have different encoding formats.

15. The non-transitory machine readable medium of claim 11, wherein the identified position of the active unicast stream is selected from the group consisting of scene based, frame based, and time based position.

16. The non-transitory machine readable medium of claim 11, wherein the identified position of the active unicast stream is received by the server.

17. The non-transitory machine readable medium of claim 11, wherein the server comprises a digital media server in a Universal Plug and Play (UPnP) network.

18. A non-transitory machine readable medium adapted to store a plurality of machine readable instructions which when executed by one or more processors of a controller are adapted to cause the controller to execute a method comprising:
  discovering an active client and an additional client on a shared network,
  receiving an active unicast stream of a media content for the active client, and
  requesting a new unicast connection to receive a new unicast stream of the media content for the additional client, wherein the new unicast stream is synchronized with the active unicast stream to deliver the media content simultaneously to the active client and the additional client.

19. The non-transitory machine readable medium of claim 18, wherein the method further comprises requesting a position of the active unicast stream from which to start the new unicast stream.

20. The non-transitory machine readable medium of claim 18, wherein the controller comprises a digital media controller in a Universal Plug and Play (UPnP) network.

* * * * *